(12) United States Patent
Nakazawa

(10) Patent No.: US 7,202,787 B2
(45) Date of Patent: Apr. 10, 2007

(54) NON-AUTHENTIC ARTICLE DISCRIMINATION SYSTEM, AND METHOD FOR DISCRIMINATING NON-AUTHENTIC ARTICLE

(75) Inventor: Tsutomu Nakazawa, Isesaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 45 days.

(21) Appl. No.: 10/952,572

(22) Filed: Sep. 29, 2004

(65) Prior Publication Data

US 2005/0151617 A1    Jul. 14, 2005

(30) Foreign Application Priority Data

Sep. 29, 2003    (JP)    ............................. 2003-338858

(51) Int. Cl.
*G08B 13/14* (2006.01)
*G06F 19/00* (2006.01)

(52) U.S. Cl. .................. 340/572.1; 340/5.8; 340/5.86; 235/385

(58) Field of Classification Search ............. 340/572.1, 340/10.6
See application file for complete search history.

(56) References Cited

U.S. PATENT DOCUMENTS

| | | | |
|---|---|---|---|
| 5,500,651 A * | 3/1996 | Schuermann | 342/42 |
| 5,548,106 A * | 8/1996 | Liang et al. | 235/454 |
| 5,850,187 A * | 12/1998 | Carrender et al. | 340/10.6 |
| 6,094,133 A * | 7/2000 | Shimamura et al. | 340/505 |
| 7,031,946 B1 | 4/2006 | Tamai et al. | |
| 2003/0059050 A1* | 3/2003 | Hohberger et al. | 380/270 |

FOREIGN PATENT DOCUMENTS

| | | | |
|---|---|---|---|
| JP | TW 471674 | 1/1991 | |
| JP | CN 1086027 A | 4/1994 | |
| JP | H10-97601 A | 4/1998 | |
| JP | H11-205202 A | 7/1999 | |
| JP | 2000-200222 | 7/2000 | |
| JP | P2000-251164 A | 9/2000 | |

OTHER PUBLICATIONS

Chinese Office Action, dated Feb. 17, 2006.
Korean Office Action, dated May 26, 2006.

* cited by examiner

*Primary Examiner*—Donnie L. Crosland
(74) *Attorney, Agent, or Firm*—Watchstone P+D, plc; Stephen B. Parker

(57) ABSTRACT

A non-authentic article discrimination system for discriminating whether an article to which an IC tag is attached is a non-authentic article includes an IC tag and a base device. The IC tag includes a first antenna portion for receiving a radio wave, a power generation circuit for generating electric power from the radio wave received by the first antenna portion, a first storing portion for storing information regarding the article, and a radio wave output circuit for outputting a radio wave including the information stored in the first storing portion via the first antenna portion. The base device includes a second antenna portion for receiving the radio wave transmitted from the first antenna portion and transmitting a radio wave generated in the base device toward the IC tag, a second storing portion for storing information regarding the article, the information stored in the second storing portion being the same as the information stored in the first storing portion, a discriminating portion for discriminating whether the first information included in the radio wave received by the second antenna portion coincides with the information stored in the second storing portion, and a displaying portion for displaying a discrimination result of the discrimination portion.

5 Claims, 7 Drawing Sheets

NON-AUTHENTIC ARTICLE DISCRIMINATION SYSTEM, AND METHOD FOR DISCRIMINATING NON-AUTHENTIC ARTICLE

This application claims priority under 35 U.S.C. §119 to Japanese Patent Application No. P2003-338858 filed on Sep. 29, 2003, the entire disclosure of which is incorporated herein by reference in its entirety.

BACKGROUND OF THE INVENTION

1. Field of the Invention

The present invention relates to a non-authentic article discrimination system for discriminating whether an article to which an IC tag is attached is a non-authentic article, and also relates to a method for discriminating a non-authentic article using an IC tag and a base device.

2. Description of the Related Art

The following description sets forth the inventor's knowledge of related art and problems therein and should not be construed as an admission of knowledge in the prior art.

Conventionally, for example, in order to discriminate a non-authentic article, an imitation preventing label is attached to an article to be discriminated, and then ultraviolet light is irradiated thereto to thereby discriminate the authenticity. In another attempts, for example, a manufacture serial number is given to each product so as to discriminate the authenticity. However, even if an imitation preventing label or tag is attached to, e.g. an expensive product, if the label or tag is a non-authentic one, it is difficult to discriminate the authenticity of the product. On the other hand, even if the imitation preventing countermeasure is taken, if the authentic discrimination steps are complicated, it is also difficult to discriminate whether the product is non-authentic and also may take a time to complete it.

The description herein of advantages and disadvantages of various features, embodiments, methods, and apparatus disclosed in other publications is in no way intended to limit the present invention. For example, certain features of the preferred embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY OF THE INVENTION

The preferred embodiments of the present invention have been developed in view of the above-mentioned and/or other problems in the related art. The preferred embodiments of the present invention can significantly improve upon existing methods and/or apparatuses.

Among other potential advantages, some embodiments can provide a non-authentic article discrimination system for discriminating whether an article to which an IC tag is attached is a non-authentic article.

Among other potential advantages, some embodiments can provide a method for discriminating whether an article to which an IC tag is attached is a non-authentic article.

According to a first aspect of a preferred embodiment of the present invention, a non-authentic article discrimination system for discriminating whether an article to which an IC tag is attached is a non-authentic article, includes:
an IC tag; and
a base device,
wherein the IC tag includes:
a first antenna portion for receiving a radio wave;
a power generation circuit for generating electric power from the radio wave received by the first antenna portion;
a first storing portion for storing information regarding the article; and
a radio wave output circuit for outputting a radio wave including the information stored in the first storing portion via the first antenna portion, and
wherein the base device includes:
a second antenna portion for receiving the radio wave transmitted from the first antenna portion and transmitting a radio wave generated in the base device toward the IC tag;
a second storing portion for storing information regarding the article, the information stored in the second storing portion being the same as the information stored in the first storing portion;
a discriminating portion for discriminating whether the first information included in the radio wave received by the second antenna portion coincides with the information stored in the second storing portion; and
a displaying portion for displaying a discrimination result of the discrimination portion.

According to a second aspect of a preferred embodiment of the present invention, a non-authentic article discrimination system for discriminating whether an article to which an IC tag is attached is a non-authentic article, includes:
an IC tag; and
a base device,
wherein the IC tag includes:
a first antenna portion for receiving a radio wave;
a power generation circuit for generating electric power from the radio wave received by the first antenna portion;
a first storing portion for storing information regarding the article; and
a receiving circuit configured to receive the radio wave received by the first antenna portion;
a discrimination circuit for discriminating whether the information stored in the first storing portion coincides with information regarding the article included in the radio wave received by the receiving portion; and
and a light-emitting diode for emitting light depending on a discrimination result of the discrimination circuit,
wherein the base device includes:
a second storing portion for storing information regarding the article, the information stored in the second storing portion being the same as the information stored in the first storing portion;
a second antenna portion for transmitting the radio wave including the information stored in the second storing portion toward the IC tag; and
a radio wave supplying circuit for supplying the radio wave including the information stored in the second storing portion to the second antenna portion.

According to a third aspect of a preferred embodiment of the present invention, a non-authentic article discrimination system for discriminating whether an article to which an IC tag is attached is a non-authentic article, includes:
an IC tag; and
a base device,
wherein the IC tag includes:
a first antenna portion for receiving a radio wave;
a power generation circuit for generating electric power from the radio wave received by the first antenna portion;
a first storing portion for storing information regarding the article; and a receiving circuit configured to receive the radio wave received by the first antenna portion;

a discrimination circuit for discriminating whether the information stored in the first storing portion coincides with information regarding the article included in the radio wave received by the receiving portion; and and a radio wave transmitting portion for transmitting a radio wave including the information stored in the first storing portion via the first antenna portion depending on a discrimination result of the discrimination circuit, wherein the base device includes:

a second storing portion for storing information regarding the article, the information stored in the second storing portion being the same as the information stored in the first storing portion;

a second antenna portion for transmitting a radio wave including the information stored in the second storing portion toward the IC tag;

a radio wave supplying circuit for supplying a radio wave including the information stored in the second storing portion to the second antenna portion;

a discrimination circuit for discriminating whether the information stored in the second storing portion coincides with the information included in the radio wave received by the second antenna portion; and a displaying portion for displaying a discrimination result of the discrimination portion.

In the non-authentic article discrimination system, preferably, the information stored in the first storing portion and the information stored in the second storing portion are the same manufacturer ID code of the article.

In the non-authentic article discrimination system, the base device further can preferably include an alarm device which makes warning sound depending on the discrimination result.

In the non-authentic article discrimination system, the IC tag can further include a light-emitting diode for emitting light depending on a discrimination result of the discrimination circuit.

The non-authentic article discrimination system can further include a computing circuit for computing the information stored in the storing portion depending on a discrimination result of the discrimination circuit.

According to a fourth aspect of a preferred embodiment of the present invention, a method for discriminating whether an article to which an IC tag is attached is a non-authentic article, comprises:

attaching an IC tag to an article to be discriminated whether the article is a non-authentic article;

outputting a radio wave including information regarding the article from the IC tag toward a base device;

receiving the radio wave from the IC tag by the base device;

discriminating whether the information included in the radio wave received by the base device coincides with the information stored in the base device; and computing the information in the base device to obtain changed information;

outputting the changed information toward the IC tag;

receiving the changed information by the IC tag;

computing the information stored in the IC tag to obtain changed information;

discriminating whether the changed information obtained from the base device coincides with the changed information obtained in the IC tag;

emitting light depending a discrimination result.

According to a fifth aspect of a preferred embodiment of the present invention, a method for discriminating whether an article to which an IC tag is attached is a non-authentic article, comprises:

attaching an IC tag to an article to be discriminated whether the article is a non-authentic article;

outputting a radio wave including information regarding the article from a base device toward an IC tag;

receiving the radio wave from the base device by the IC tag;

discriminating whether the information included in the radio wave received by the IC tag coincides with the information stored in the IC tag; and computing the information stored in the IC tag to obtain changed information;

outputting the changed information toward the base device;

receiving the changed information by the base device;

computing the changed information received by the base device to obtain further changed information;

outputting the further changed information toward the IC tag;

receiving the further changed information by the IC tag;

discriminating whether the further changed information obtained from the base device coincides with another information stored in the IC tag;

emitting light depending a discrimination result.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/ or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

A non-authentic article discrimination system according to embodiments of the present invention will be explained with reference to the attached drawings. The following explanation will be directed to a non-authentic article discrimination system for discriminating whether a brand name product to which an IC tag is attached is imitation. However, it should be understood that this discrimination system is not limited to the above and can also be applied to various applications required to discriminate whether an article to which the IC tag is attached is a non-authentic article in various industries.

A non-authentic article discrimination system according to an embodiment of the present invention will be explained with reference to the attached drawings.

Figure 1:
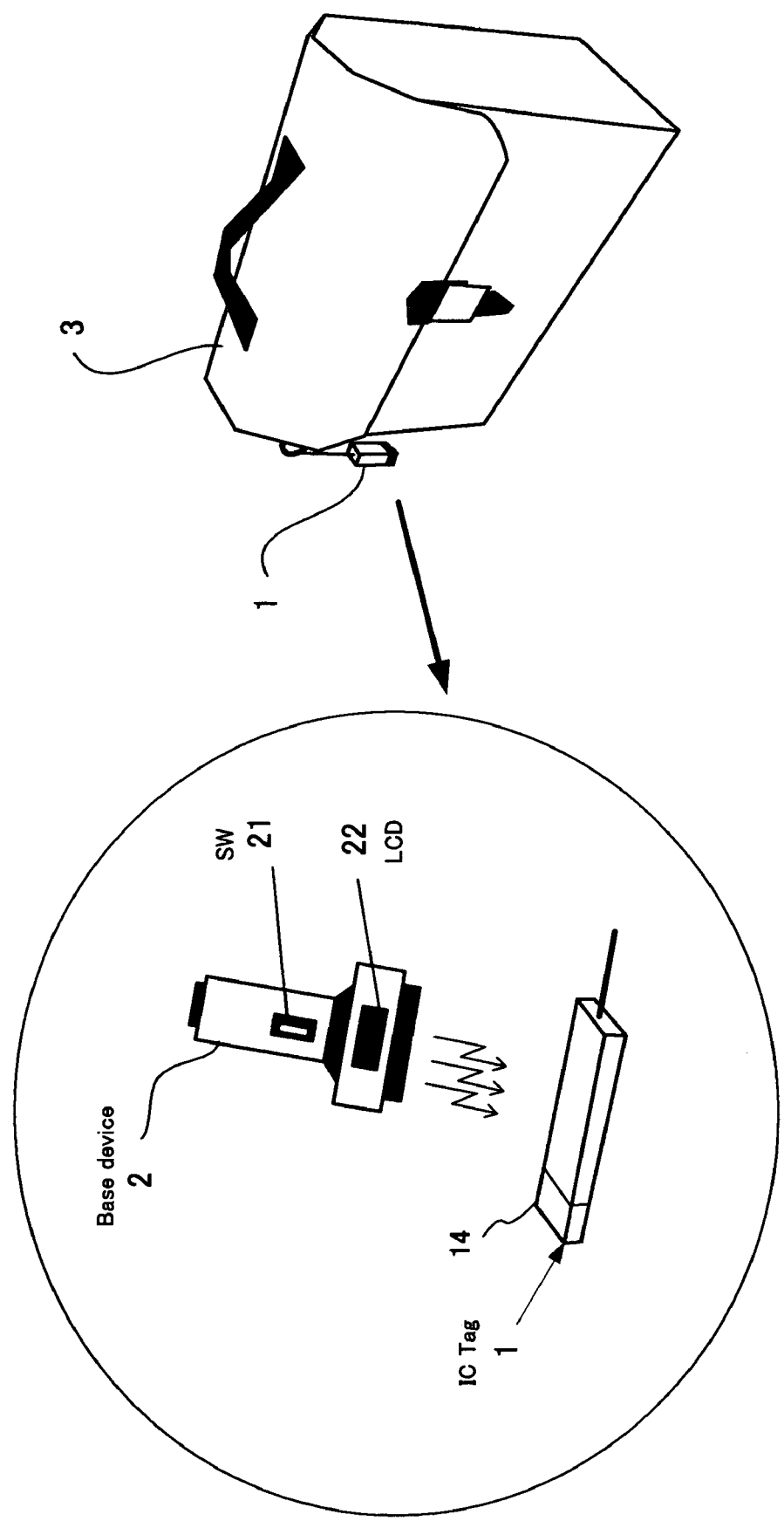
FIG. 1 is a schematic view showing an entire non-authentic article discrimination system including an IC tag and a base device according to an embodiment of the present invention.

FIG. 1 depicts a schematic view showing an illustrative entire system including an IC tag 1 and a base device 2. In this example, the IC tag 1 is attached to a brand name bag 3 for the purpose of proving that the bag 3 to which the IC tag 1 is attached is genuine. In other words, the IC tag 1 is used to discriminate whether the bag 3 is genuine or imitation.

Figure 2:
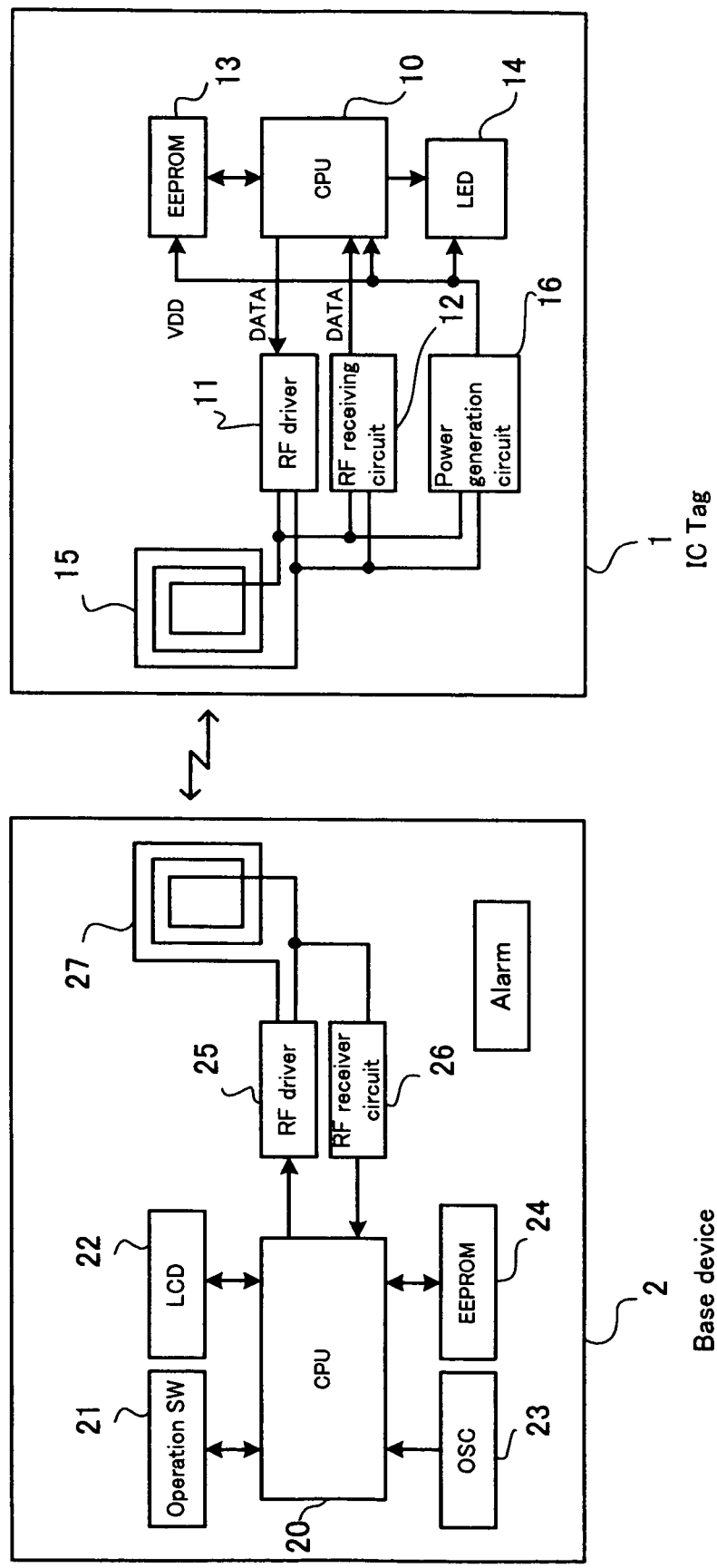
FIG. 2 is a block diagram of the entire non-authentic article discrimination system.

The block diagram of the entire system is shown in FIG. 2. In the right side block diagram showing the IC tag 1, reference numeral "10" denotes a central processing unit (hereinafter referred to as "CPU" for controlling, e.g., the entire operations of the IC tag 1, "11" denotes a RF driver, "12" denotes a receiving circuit, "13" denotes an EEPROM for storing, e.g., program software and a manufacturer ID code, "14" denotes a light-emitting diode (hereinafter referred to as "LED"), and "15" denotes an antenna.

In the left side block diagram showing the base device 2, reference numeral "20" denotes a CPU for controlling, e.g., the entire operations of the device 2, "21" denotes an operation switch (SW), "22" denotes a liquid crystal display (hereinafter referred to as "LCD"), "23" denotes an oscillator (OSC) for creating clock signals for a system clock and a time function, "24" denotes an EEPROM storing, e.g., software, "25" denote a RF driver, "26" denotes a RF receiving circuit, and "27" denotes an antenna.

In the discrimination device 2, when the operation switch 21 is pressed, the CPU 20 receives clock signals from the oscillator (OSC) 23 and initiates various operations depending on the program stored in the EEPROM 24. The CPU 20 makes the RF driver 25 wirelessly output a radio wave including information via the antenna 27. This antenna 27 not only transmits the radio wave but also receives a radio wave including information emitted from the IC tag 1. The radio wave including the information, which is analog information, received by the antenna 27 will be introduced into the RF receiving circuit 26. The RF receiving circuit 26 converts the received analog information into digital information which will be inputted into the CPU 20. The CPU 20 stores the digitalized information in a register provided in the CPU 20. In this embodiment, the EEPROM 24 also stores information regarding an article to be discriminated, e.g., a manufacturer ID code of the aforementioned brand name bag 3. Thus, the CPU 20 can compare the digitalized information on the manufacturer ID code stored in the EEPROM 24 with the digitalized information inputted from the RF receiving circuit 26. Depending on the compared result, for example, the CPU 20 can make the LCD 22 display the compared result. Depending on the program stored in the EEPROM 24, the CPU 20 transfers the digitalized information including the manufacturer ID code stored in the EEPROM 24 to the FR driver 25. The RF driver 25 converts the digitalized information inputted from the CPU 20 into analog information and wirelessly outputs a radio wave including the analog information via the antenna 27.

On the other hand, in the IC tag 1 attached to, e.g. a brand name bag 3, the antenna 15 receives the radio wave including the manufacturer ID code stored in the EEPROM 24 emitted from the base device 2. In the power generation circuit 16, the radio wave received by the antenna 15 is converted into electric power which in turn will be supplied to, e.g. the EEPROM 13, the CPU 10 and the LED 14. The radio wave received by the antenna 15 will also be introduced into the RF receiving circuit 12. The RF receiving circuit 12 converts the analog information included in the received radio wave into digital information and transfers the digitalized information to the CPU 10. The CPU 10 stores the digitalized information transferred from the RF receiving circuit 12 in a register provided in the CPU 10. The CPU 10 initiates various processing depending on the program stored in the EEPROM 13. This EEPROM 13 also stores, e.g., a manufacturer ID code of the aforementioned brand name bag 3. Thus, the CPU 10 can compare the information on the manufacturer ID code stored in the EEPROM 13 with the digitalized information from the RF receiver circuit 12. Depending on the compared result, for example, the CPU 10 can make the LED 14 emit a light and/or transfer information to the RF driver 11. The RF driver 11 converts the analog information from the CPU 10 into digital information and wirelessly outputs the digitalized information as a radio wave via the antenna 15.

In the non-authentic article discrimination system, the discrimination on whether an article (e.g., a brand name bag) with the IC tag 1 is genuine or imitation can be performed by the following methods.

According to a first discrimination method, the discrimination will be performed at the IC tag side. In this case, the IC tag 1 wirelessly receives information including the manufacturer ID code inherent to the article (e.g., a brand name bag) from the base device 2 and compares the manufacturer ID code with the manufacturer ID code previously stored in the IC tag 1. If both the information coincides with each other, it is discriminated that the article (e.g., a brand name bag) is genuine. Therefore, the LED 14 emits light. To the contrary, if both the information does not coincide, since it is discriminated that the article (e.g., a brand name bag) is imitation, the LED 14 does not emit light.

In detail, in the aforementioned first method, the base device 2 wirelessly transmits a radio wave including the manufacturer ID code stored in the EEPROM 24 via the antenna 27. Then, in the IC tag 1, the radio wave including the manufacturer ID code is received by the RF receiving circuit 12 via the antenna 15. The RF receiving circuit 12 converts the manufacturer ID code into a digital value and outputs the digital value to the CPU 10. The CPU 10 temporarily stores the digitalized manufacturer ID code in a register provided in the CPU 10, and compares the manufacturer ID code with a manufacturer ID code stored in the EEPROM 13. If both the information coincides with each other, the CPU 10 makes the LED 14 emit light. To the contrary, if both the information does not coincide, the CPU 10 does not make the LED 14 emit light. Accordingly, a user can easily and instantly discriminate whether the article 3 (e.g., brand name bag) is genuine or imitation. In this method, if a correct manufacturer ID code was not obtained from the base device 2, it is discriminated that the article (e.g., a brand name bag) is imitation.

According to a second discrimination method, the discrimination will be performed at the discrimination device side. In this case, the base device 2 wirelessly receives information including the manufacturer ID code inherent to the article (e.g., a brand name bag) from the IC tag 1 and compares the manufacturer ID code with the manufacturer ID code previously stored in the base device 2. If both the information coincides with each other, it is discriminated that the article (e.g., a brand name bag) is genuine. Therefore, "Genuine" will be displayed on the LCD 22. To the contrary, if both the information does not coincide, since it is discriminated that the article (e.g., a brand name bag) is imitation, "Imitation" will be displayed on the LCD 22.

In detail, in the IC tag 1, when the CPU 10 is activated, the CPU 10 makes the RF driver 11 transmit a radio wave including the information on the manufacturer ID code via the antenna 15. Then, in the base device 2, the radio wave including the manufacturer ID code is received by the RF receiving circuit 26 via the antenna 27. The RF receiving circuit 26 converts the manufacturer ID code into a digital value and outputs the digital value to the CPU 20. The CPU 20 temporarily stores the digitalized manufacturer ID code in a register provided in the CPU 20, and compares the manufacturer ID code with a manufacturer ID code stored in the EEPROM 24. If both the information coincides with each other, the CPU 20 makes the LCD 22 display "Genuine." To the contrary, if both the information does not coincide, the CPU 20 makes the LCD 22 display "Imitation." Accordingly, a user can easily and instantly discriminate whether the article 3 (e.g., brand name bag) is genuine or imitation. In this method, if a correct manufacturer ID code was not obtained from the IC tag 1, it is discriminated that the article (e.g., a brand name bag) is imitation.

In each of the aforementioned discrimination methods, in cases where the discrimination is performed by comparing the manufacturer ID codes and that the manufacturer ID code is 16 bits, the probability of finding the radio wave pattern which causes the LED 14 to emit is 1/256. It is considered that this is reliable from a practical standpoint.

In order to further enhance the reliability of the discrimination system, the following method can be employed. The method will be explained with reference to the flowchart shown in FIG. 3. In this disclosure, "Step" may be abbreviated as "S."

In the base device 2, the operation switch (SW) 21 is pressed to turn ON the base device 2 near the IC Tag 1 with the antenna 27 directed toward the IC Tag 1. This causes the RF driver 25 to output a weak radio wave in the order of 10 mW via the antenna 27 (Step 1).

In the IC Tag 1, the power generation circuit 16 receives the radio wave via the antenna 15 and then rectifies the RF carriers of the received radio wave to generate electric power, i.e., power supply voltage VDD. The power supply voltage VDD will be applied to each portion of the IC Tag 1 including, e.g., the EEPROM 13, the CPU 10 and the LED 14 (Step 2).

The base device 2 outputs the manufacturer ID code stored in the EEPROM 24 via the antenna 27. The information on this manufacturer ID code is included in the radio wave. Accordingly, S3 is performed simultaneously with S1 (Step 3).

In the IC Tag 1, the radio wave including the manufacturer ID code is received by the antenna 15 and introduced into the RF receiving circuit 12. The manufacturer ID code which is analog data is converted into digital data and then inputted into the CPU 10 as digital data (Step 4).

The CPU 10 temporarily stores the digitalized data of the manufacturer ID code in a register provided in the CPU 10, and compares the digitalized data temporarily stored in the register with a first manufacturer ID code previously stored in the EEPROM 13 (Step 5).

If it is discriminated that the digitalized data does not coincide with the first manufacturer ID code ("No" at S5), the processing terminates.

On the hand, if it is discriminated that the digitalized data coincide with the first manufacturer ID code ("Yes" at S5), the CPU 10 in the IC Tag 1 computes the manufacturer ID stored in the EEPROM 13 to change the manufacturer ID code. The obtained changed manufacturer ID code will be referred to as "changed manufacturer ID code." The changed manufacturer ID code is wirelessly outputted as a radio wave via the antenna 15 (Step 6).

In the base device 2, the antenna 27 receives the radio wave including the changed manufacturer ID code information, and the CPU 20 stores the changed manufacturer ID code in a register provided in the CPU 20 and then re-computes the changed manufacturer ID code to further change the ID code. The obtained changed manufacturer ID code will be referred to as "further changed manufacturer ID code." The further changed manufacturer ID code is wirelessly outputted as a radio wave via the antenna 27 (Step 7).

In the IC Tag 1, the radio wave including the further changed manufacturer ID code is received by the antenna 15. The CPU 10 compares the received further changed manufacturer ID code with another manufacturer ID code previously stored in the EEPROM 13 (Step 8).

If it is discriminated that the further changed manufacturer ID code does not coincide with the another manufacturer ID code previously stored in the EEPROM 13 ("No" at S8), the processing terminates.

On the other hand, if it is discriminated that the further changed manufacturer ID code coincides with the aforementioned another manufacturer ID code previously stored in the EEPROM 13 ("Yes" at S8), the LED 14 is turned on to emit light.

In the aforementioned discrimination method (Step 1 through Step 8), within a limited time period after the discrimination of the CPU 10 that the first manufacturer ID codes coincide, it is required to compare the manufacturer ID code changed twice with the previously stored manufacturer ID code. Accordingly, the finding of the radio wave pattern which causes the LED 14 to emit light becomes impossible.

Figure 3:
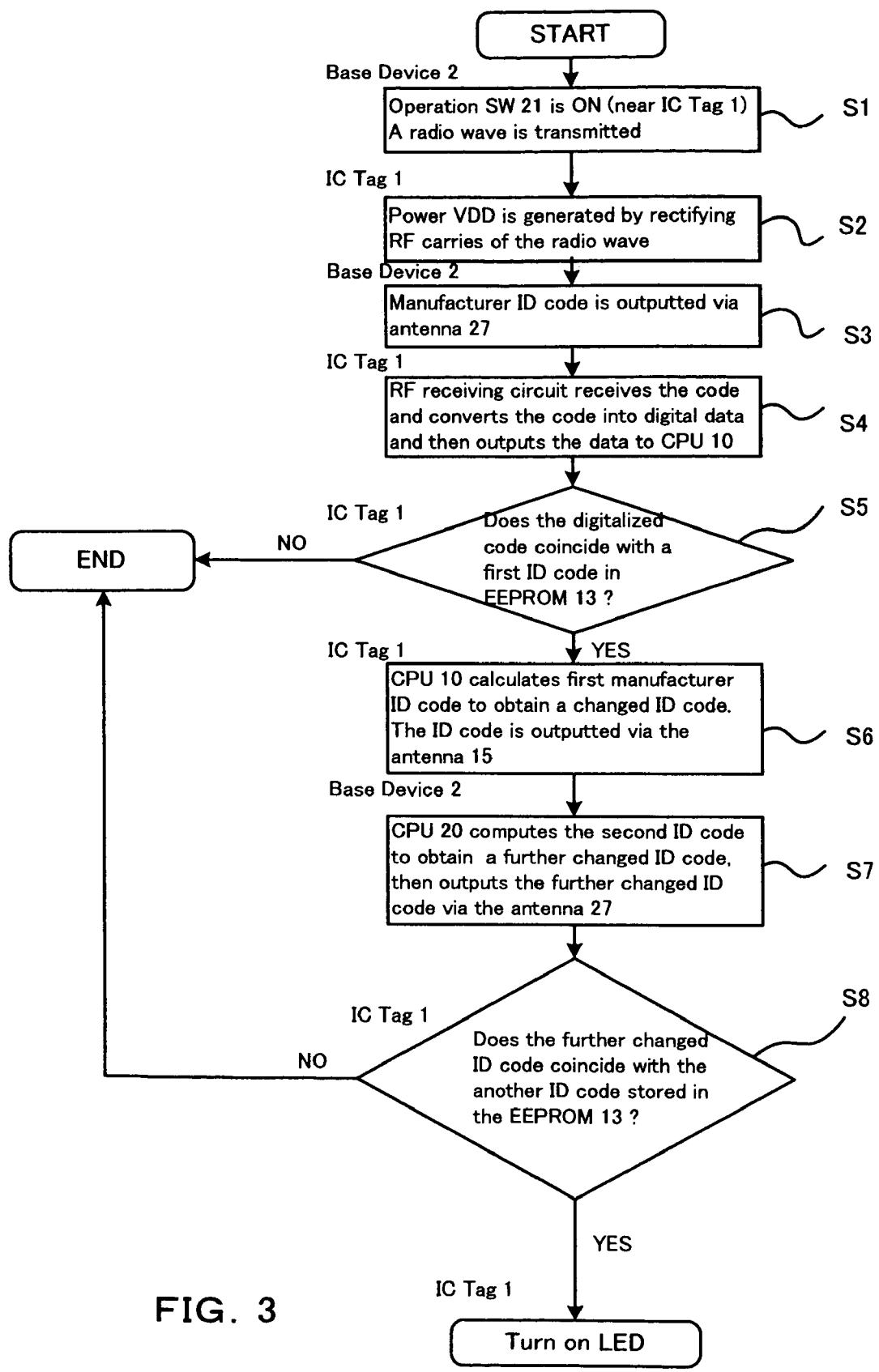
FIG. 3 is a flowchart showing an operation of the system.

It should be understood that the flowchart shown in FIG. 3 is an example and that the number of data, the number of computation, the number of comparison, etc., are not limited to the above.

Figure 4:
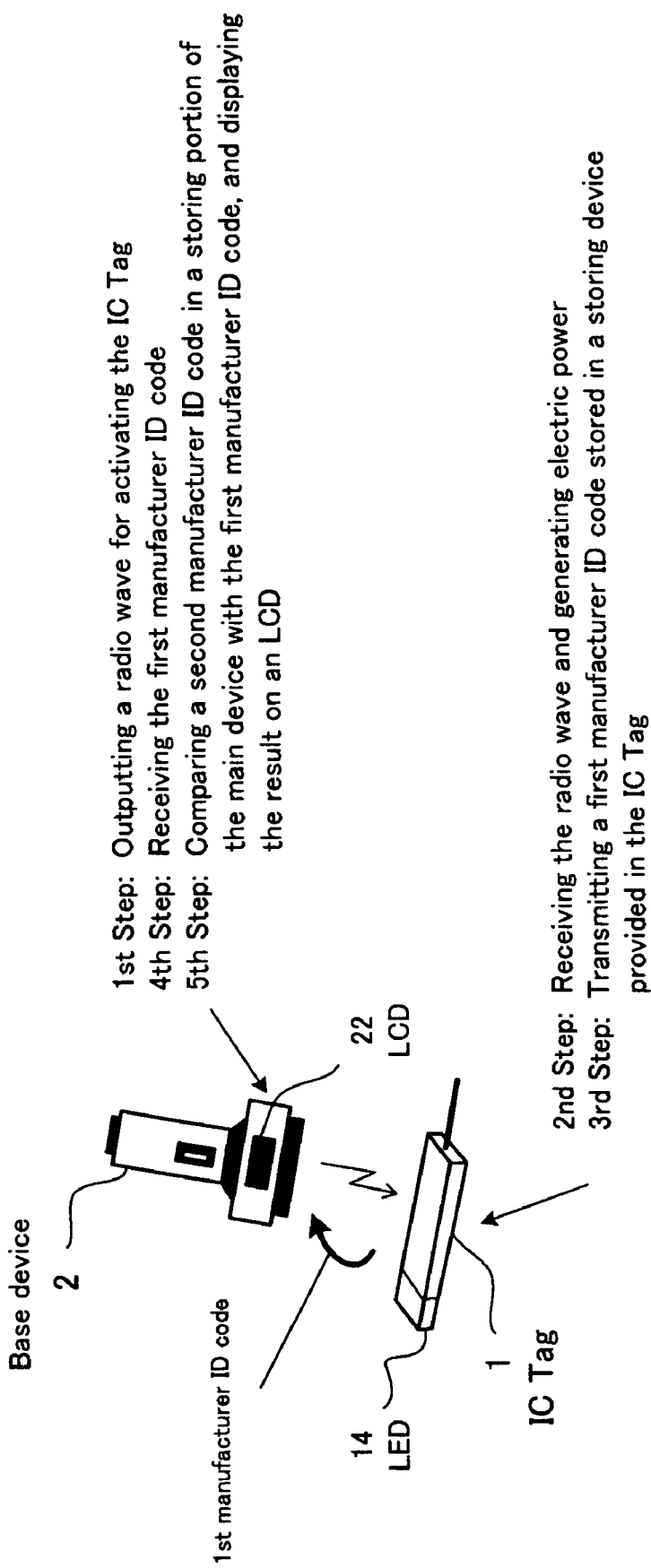
FIG. 4 is an explanatory view showing an operation of a first embodiment of the system.

FIG. 4 depicts an illustrative schematic view showing an embodiment of a non-authentic article discrimination system. In this system, a radio wave for activating the IC Tag 1 is outputted ($1^{st}$ Step). In the IC Tag 1, the radio wave is received and electric power is generated ($2^{nd}$ Step), and a first manufacturing ID code stored in a storing device provided in the IC Tag 1 is transmitted ($3^{rd}$ Step). Then, in the base device 2, the first manufacturer ID code is received ($4^{th}$ Step), and the first manufacturer ID code is compared with a second manufacturer ID code stored in a storing portion in the base device 2. Then, an LCD 22 displays the result, e.g., "Imitation," or "Genuine." ($5^{th}$ Step). Thus, it is possible for a user to discriminate whether the article, e.g., a brand name bag, to which the IC Tag 1 is attached is an imitation article or a genuine article.

Figure 5:
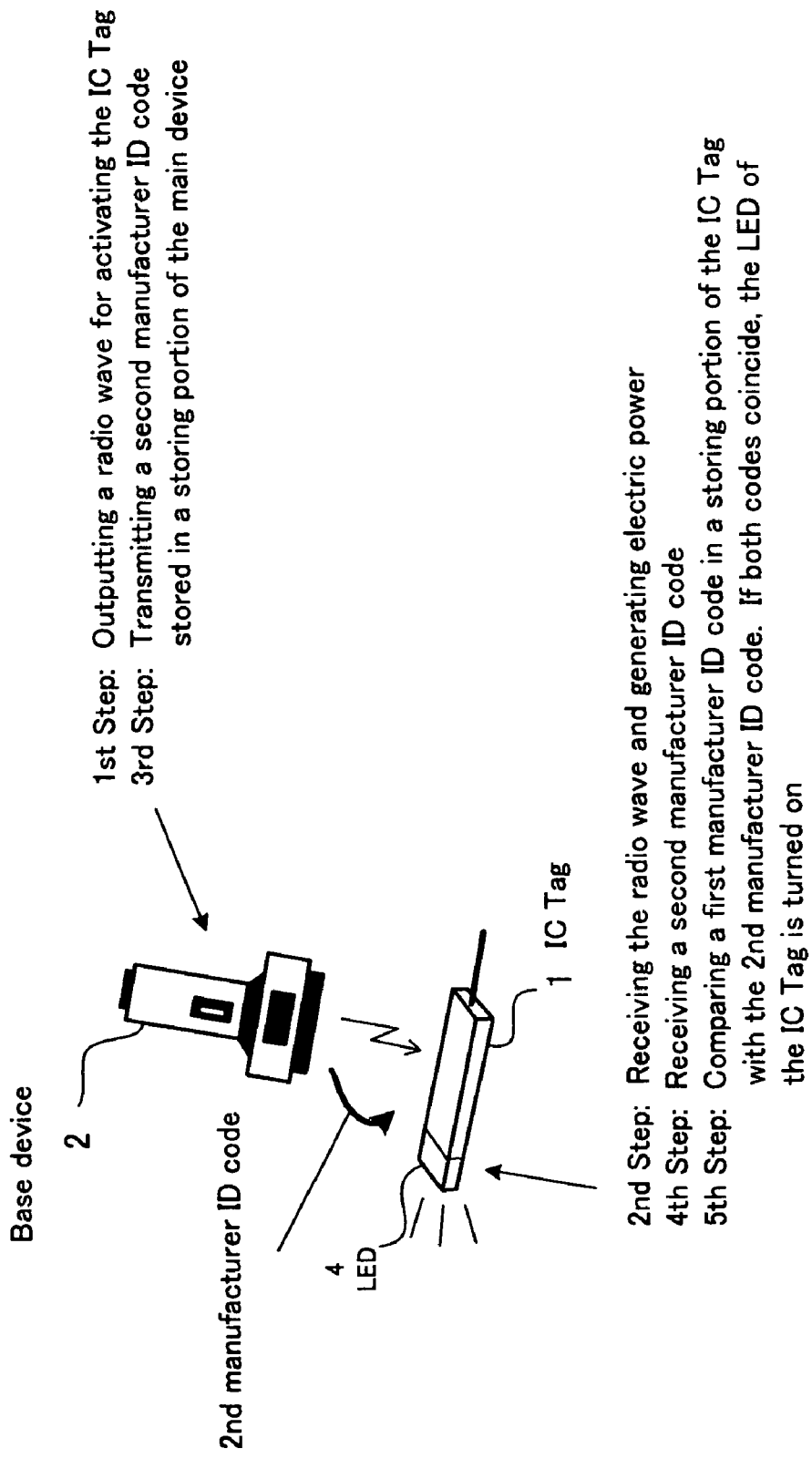
FIG. 5 is an explanatory view showing an operation of a second embodiment of the non-authentic article discrimination system.

FIG. 5 depicts an illustrative schematic view showing another embodiment of a non-authentic article discrimination system. In this system, a radio wave for activating the IC Tag 1 is outputted from the base device 2 ($1^{st}$ Step). In the IC Tag 1, the radio wave is received and electric power is generated ($2^{nd}$ Step). The base device 2 transmits a second manufacturer ID code stored in a storing portion of the base device 2 ($3^{rd}$ Step). Then, in the IC Tag 1, the second manufacturer ID code is received ($4^{th}$ Step), and the second manufacturer ID code is compared with a first manufacturing ID code stored in a storing portion provided in the IC Tag 1 ($5^{th}$ Step). Then, if both the codes coincide, the LED 14 of the IC Tag 1 is turned on to emit light. Thus, it is possible for a user to discriminate whether the article to which the IC Tag 1 is attached is an imitation article or a genuine article.

Figure 6:
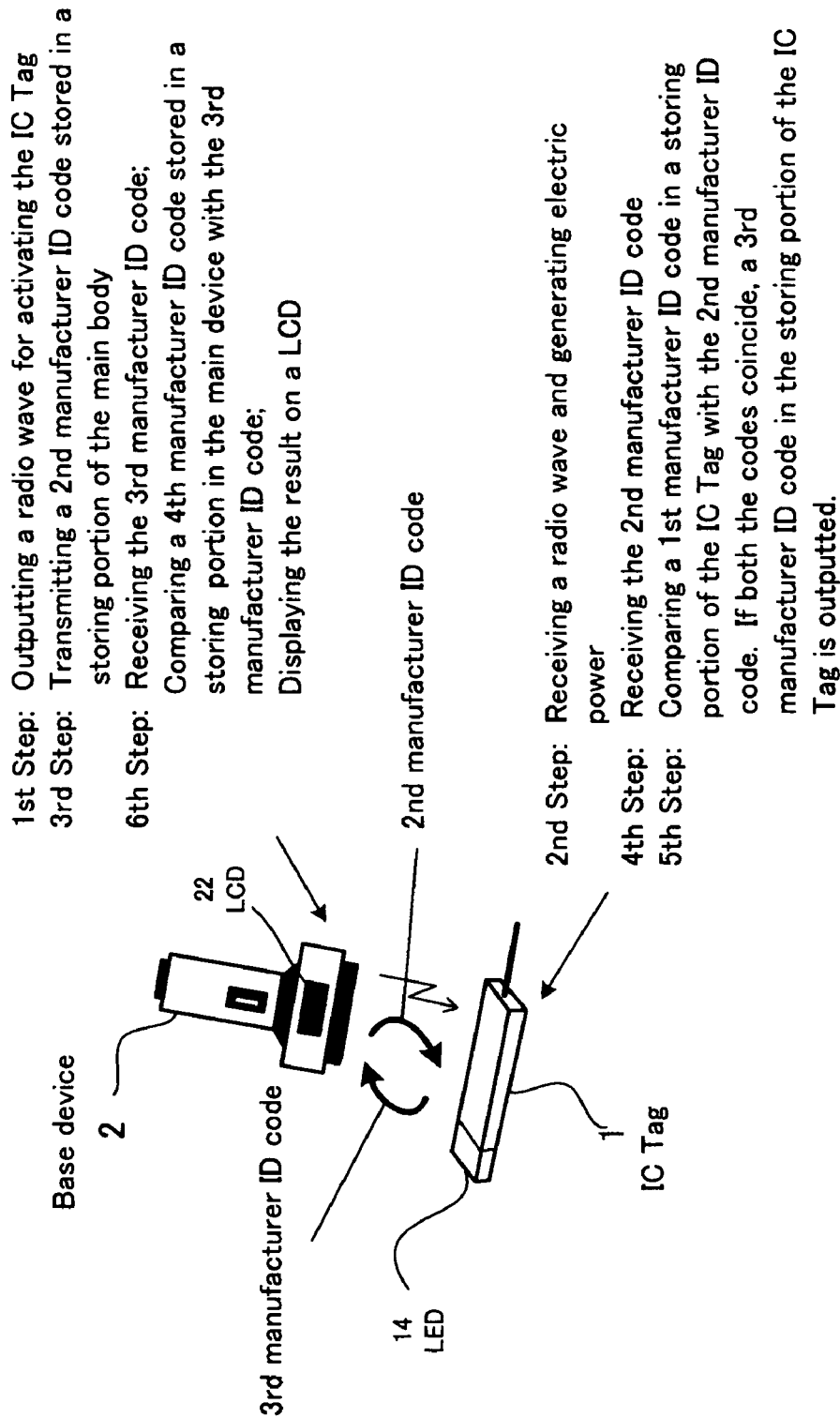
FIG. 6 is an explanatory view showing an operation of a third embodiment of the non-authentic article discrimination system.

FIG. 6 depicts an illustrative schematic view showing still another embodiment of a non-authentic article discrimination system. In this system, a radio wave for activating the IC Tag 1 is outputted from the base device 2 ($1^{st}$ Step). In the IC Tag 1, the radio wave is received and electric power is generated ($2^{nd}$ Step). Further, the base device 2 transmits a second manufacturer ID code stored in a storing portion of the base device 2 ($3^{rd}$ Step). Then, the IC Tag 1 receives the second manufacturer ID code ($4^{th}$ Step), and compares the second manufacturer ID code with a first manufacturer ID code stored in a storing device provided in the IC Tag 1. Then, if both the codes coincide, the IC Tag 1 transmits a third manufacturer ID code stored in the storing portion of the IC Tag ($5^{th}$ Step). Then, the base device 2 receives the third manufacturer ID code, and compares the third manufacturer ID code with a fourth manufacturer ID code stored in a storing portion of the base device 2. Then, the LCD 22 displays the result, e.g., "Imitation," or "Genuine." ($6^{th}$ Step) based on the compared result. Thus, it is possible for a user to discriminate whether the article, e.g., a brand name bag, to which the IC Tag 1 is attached is an imitation article or a genuine article.

Figure 7:
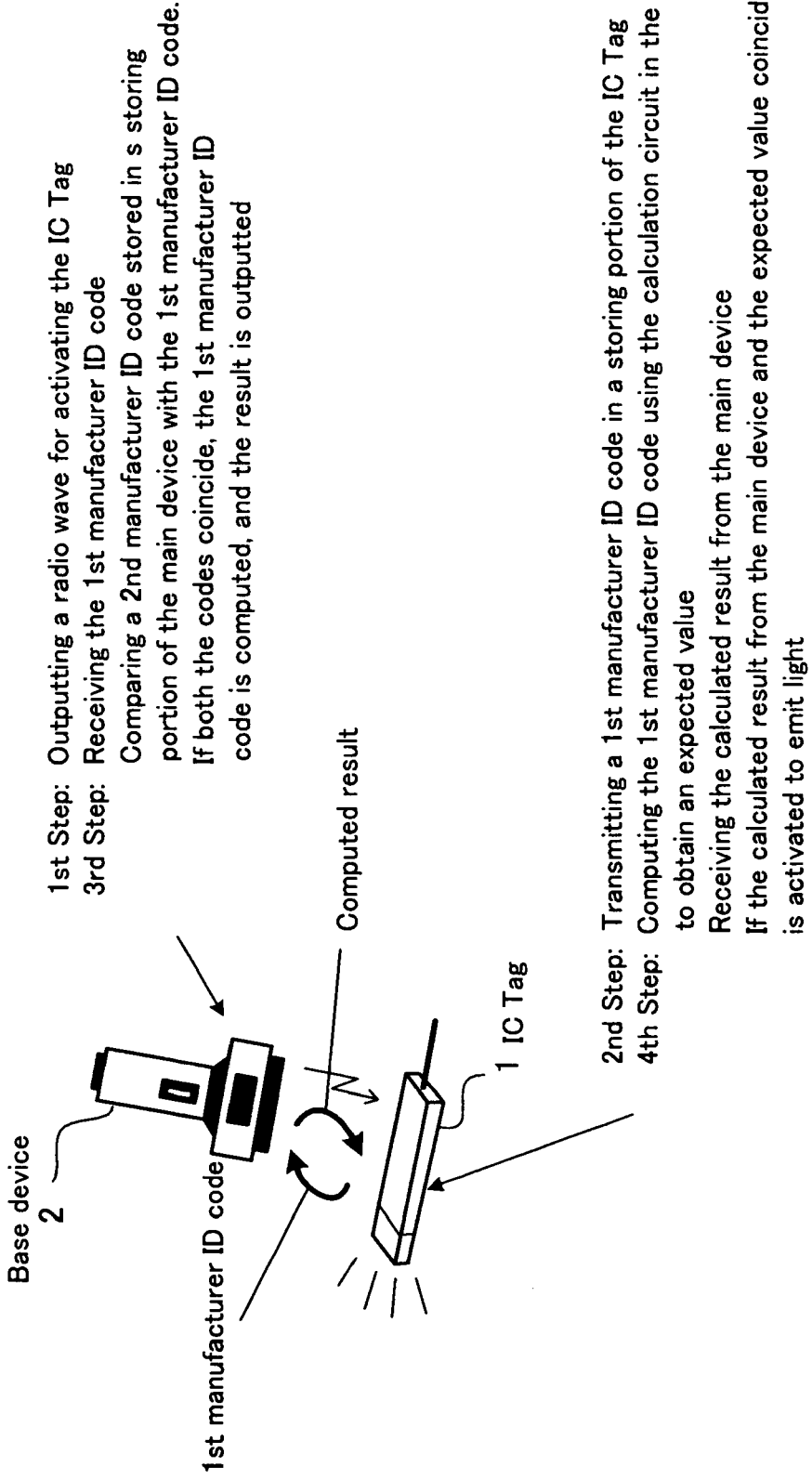
FIG. 7 is an explanatory view showing an operation of a fourth embodiment of the non-authentic article discrimination system.

FIG. 7 depicts an illustrative schematic view showing still another embodiment of a non-authentic article discrimination system. In this system, a radio wave for activating the IC Tag 1 is outputted from the base device 2 ($1^{st}$ Step). In the IC Tag 1, a first manufacturer ID code is stored in a storing portion of the IC tag 1 is transmitted toward the base device 2 ($2^{nd}$ Step). Then, the IC Tag 1 receives the first manufacturer ID code, and compares the second manufacturer ID code with the first manufacturer ID code stored in a storing device provided in the IC Tag 1. Then, if both the codes coincide, the first manufacturer code is computed, and the result is outputted ($3^{rd}$ Step). Then, in the base device 2, the first manufacturing ID code is computed using the calculation circuit in the IC tag to obtain an expected value, and the result is received from the base device. If the result from the base device and the expected value coincide, the LED is activated to emit light. Thus, it is possible for a user to discriminate whether the article, e.g., a brand name bag, to which the IC Tag 1 is attached is an imitation article or a genuine article.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" is meant as an non-specific, general reference and may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "note well."

What is claimed is:

1. A non-authentic article discrimination system for discriminating whether an article to which an IC tag is attached is a non-authentic article, the non-authentic article discrimination system comprising:

the IC tag; and a base device;

wherein the IC tag includes:

a first antenna portion for receiving a radio wave;

a power generation circuit for generating electric power from the radio wave received by the first antenna portion;

a first storing portion for storing a first code and a second compute code, a receiving circuit to which the electric power is supplied from the power generation circuit, and which receives the radio wave from the first antenna portion;

a discrimination circuit which performs a first process for discriminating whether the first code stored in the first storing portion coincides with a second code received by the receiving circuit, and a second process for discriminating whether the second compute code stored in the first storing portion coincides with second computed result information received by the receiving circuit;

a first computing circuit in which, depending on a discrimination result between the first code and the second code made by the discrimination circuit, when the first code coincides with the second code, first computed result information is generated by computing the first code;

an output circuit for outputting the first computed result information generated by the first computing circuit; and a light-emitting diode in which, depending on a discrimination result between the second computed result information and the second compute code made by the discrimination circuit, when the second computed result information coincides with the second compute code, emission of light is performed, and the base device includes:

a radio wave supplying circuit for supplying the radio wave to the IC tag;

a second storing portion for storing the second code;

a second receiving circuit for receiving the first computed result information outputted by the output circuit of the IC tag;

a second storing portion for storing the second code;

a second receiving circuit for receiving the first computed result information outputted by the output circuit of the IC tag;

a second computing circuit for generating the second computed result information by computing the first computed result information received by the second receiving circuit; and a second output circuit for performing at third process in which the second code is outputted to the IC tag, and a fourth process in which the second computed result information is outputted to the IC tag.

2. A non-authentic article discrimination system for discriminating whether an article to which an IC tag is attached is a non-authentic article, the non-authentic article discrimination system, comprising:

the IC tag; and a base device;

wherein the IC tag includes:

a first antenna portion for receiving a radio wave;

a power generation circuit for generating electric power from the radio wave received by the first antenna portion;

a first storing portion for storing a first code and a third code, a receiving circuit to which the electric power is supplied from the power generation circuit, and which receives the radio wave from the first antenna portion;

a discrimination circuit for discriminating whether the first code stored in the first storing portion coincides with a second code received by the receiving circuit; and an output circuit, in which, depending on a discrimination result between the first code and the second code made by the discrimination circuit, when the first code coincides with the second code, the third code is outputted; and the base device includes:

a radio wave supplying circuit for supplying the radio wave to the IC tag;

a second storing portion for storing a second code and a fourth code;

a second receiving circuit for receiving the third code outputted by the output circuit of the IC tag;

a displaying portion for displaying a discrimination result between the third code received by the second receiving circuit and the fourth code;

a second output circuit for outputting the second code.

3. An IC tag to be used in combination with a base device in a non-authentic article discrimination system for discriminating whether an article to which an IC tag is attached is a non-authentic article, the IC tag, comprising:

an antenna portion for receiving a radio wave;

a power generation circuit for generating electric power from the radio wave received by the antenna portion;

a storing portion for storing a first code and a second compute code, a receiving circuit to which the electric power is supplied from the power generation circuit, and which receives the radio wave from the first antenna portion;

a discrimination circuit which performs a first process for discriminating whether the first code stored in the storing portion coincides with a second code received by the receiving circuit, and a second process for discriminating whether the second compute code stored in the storing portion coincides with second computed result information received by the receiving circuit;

a first computing circuit in which, depending on a discrimination result between the first code and the second code made by the discrimination circuit, when the first code coincides with the second code, first computed result information is generated by computing the first code;

an output circuit for outputting the first computed result information generated by the first computing circuit to the base device; and a light-emitting diode in which, depending on a discrimination result between the second computed result information which is obtained by computing the first computed result information in the case device, and is received by the receiving circuit, and the second compute code by the discrimination circuit, when the second computed result information coincides with the second compute code, emission of light is performed.

4. A method for discriminating whether an article to which an IC tag is attached is a non-authentic article using a non-authentic article discrimination system having an IC tag and a base device, the method, comprising:

a step in which the base device outputs the radio wave;

a step in which the IC tag receives the radio wave outputted by the base device, and generates electric power;

a step in which the base device outputs a second code;

a step in which the IC tag receives the second code outputted by the base device, and discriminates whether a first code prepared in advance coincides with the second code outputted by the base device;

a step in which, depending on a discrimination result between the first code and the second code, when the first code coincides with the second code, the IC tag generates first computed result information by computing the first code, and outputs the first computed result information to the base device;

a step in which the base device receives the first computed result information, generates second computed result information by computing the first computed result information, and outputs the second computed result information to the IC tag; and a step in which the IC tag receives the second computed result information, and discriminates whether the second computed result information coincides with a second compute code prepared in advance.

5. The method for discriminating whether an article to which an IC tag is attached is a non-authentic article according to claim 4, wherein, depending on a discrimination result between the second computed result information and the second compute code, when the second computed result information coincides with the second compute code, a light-emitting diode which is provided at the IC tag is emitted.

* * * * *